United States Patent [19]
Rainish

[11] Patent Number: 5,640,427
[45] Date of Patent: Jun. 17, 1997

[54] DEMODULATOR

[75] Inventor: Doron Rainish, Tel Aviv, Israel

[73] Assignee: DSP Telecommunications Ltd., Givat Shmuel, Israel

[21] Appl. No.: 272,221

[22] Filed: Jul. 8, 1994

[30] Foreign Application Priority Data

Nov. 18, 1993 [IL] Israel ............................ 107656

[51] Int. Cl.$^6$ ............................................ H04L 27/14
[52] U.S. Cl. ............................................ 375/329; 329/310
[58] Field of Search ................................ 375/322, 324, 375/329, 279, 328, 330, 325; 329/304, 306, 310

[56] References Cited

U.S. PATENT DOCUMENTS

| | | | |
|---|---|---|---|
| 3,997,847 | 12/1976 | Tong ........................... | 329/310 |
| 4,651,108 | 3/1987 | Okita et al. ................. | 375/329 |
| 5,272,447 | 12/1993 | Furuya et al. ............... | 329/304 |
| 5,355,092 | 10/1994 | Kosaka et al. ............... | 375/328 |
| 5,367,538 | 11/1994 | LaRosa et al. ............... | 375/329 |
| 5,369,374 | 11/1994 | Kojima ........................ | 375/328 |

FOREIGN PATENT DOCUMENTS

0558034 A2  9/1993  European Pat. Off. .

*Primary Examiner*—Tesfaldet Bocure
*Attorney, Agent, or Firm*—Kriegsman & Kriegsman

[57] ABSTRACT

A demodulator is described which includes a hard limiter, reference generator and a phase determiner. The hard limiter produces a binary phase-modulated signal from an analog phase modulated input signal having a first frequency. The reference generator provides a binary reference signal having a second frequency generally equivalent to the first frequency. The phase determiner is operative during a sampling period and determines the phase between the phase-modulated and the reference binary signals during the sampling period.

13 Claims, 7 Drawing Sheets

DEMODULATOR

FIELD OF THE INVENTION

The present invention relates generally to demodulators implemented in digital hardware and to demodulators of intermediate frequency (IF) signals which are implemented in digital hardware in particular.

BACKGROUND OF THE INVENTION

Digital signal processing is increasingly utilized in communication systems. In order to digitize the communication signal which is comprised of consecutive symbols or phasors, an interface is required. The traditional interface consists of a balanced, analog, demodulator providing two phase shifted signals followed by two falters and two analog to digital converters (ADCs) to determine both the inphase and quadrature values of each symbol.

For differential phase modulated intermediate (IF) signals, an IF differential detector can be utilized, comprising a $\pi/2$ phase shifter, a one symbol delay line, two mixers, a low pass filter, a symbol rate sampler, and two ADCs.

An IF differential detector operates as follows: The IF signal is multiplied with a version of itself delayed, via the symbol delay line, by one symbol. The result is passed through the low pass filter and the symbol rate sampler producing the inphase component of the modulated signal. The delayed signal is also passed through the $\pi/2$ phase shifter and the result is multiplied with the input IF signal. The result is passed through the low pass filter and the symbol rate sampler producing thereby the quadrature component of the demodulated signal.

The inphase and quadrature signals are then converted to digital signals by the ADCs. The phase difference ("phase shift") between two consecutive symbols is computed from the inphase-quadrature pair. All of the components of the IF differential detector are analog except the digital portion of the ADCs.

Other interfaces include a limiter discriminator receiver which comprises a limiter, a discriminator, an integrate and dump filter and an ADC. The IF signal is passed through the limiter and the discriminator and the result is integrated over one symbol period. The resultant signal corresponds to phase differences between consecutive symbols and is sampled once per symbol by the ADC.

The prior art demodulators mix analog and digital elements with ADCs and usually consume a lot of power and are generally difficult to implement and integrate into a digital system.

SUMMARY OF THE PRESENT INVENTION

It is therefore an object of the present invention to provide a demodulator for phase and frequency modulated signals which consumes little power and is almost entirely formed of digital components.

There is therefore provided, in accordance with a preferred embodiment of the present invention, a demodulator formed of a hard limiter, binary reference generating apparatus and a digital phase determining unit. The hard limiter provides a binary form of the input analog phase modulated input signal. The reference generating apparatus provides a binary reference signal having a frequency generally equivalent to the frequency of the input signal. Since the input signal is now binary as is the reference signal, the phase determining unit operates digitally and determines the phase between the phase-modulated and reference binary signals during the sampling period.

Additionally, in accordance with a preferred embodiment of the present invention, the digital phase shift determiner includes a) a XOR gate for indicating when the phase-modulated and reference binary signals have the same binary value, b) a clock having a frequency greater than the frequency of the input signal and c) first and second counters. The first counter provides a ST_COUNT signal having a first and a second edge and the second counter counts the number of clock pulses N1 between the first and second edges in which the output of the XOR gate is positive.

Moreover, in accordance with a preferred embodiment of the present invention, the phase determining unit also includes a phase shift calculator for determining the phase from the number of clock pulses N1.

Furthermore, in accordance with a preferred embodiment of the present invention, the demodulator also includes a phase-shifting unit for phase-shifting said reference binary signal thereby producing a phase-shifted reference binary signal. The phase shifter typically is an inverter followed by a divider for dividing the frequency of the reference binary signal in two.

In another preferred embodiment of the present invention, the phase determining unit additionally includes a second XOR gate for indicating when the phase-modulated and phase-shifted reference binary signals have the same binary value and a third counter for counting the number of clock pulses N2 between the first and second edges in which the output of the second XOR gate is positive. In this embodiment, the phase calculator determines the phase from the number of clock pulses N1 and the sign of the phase from the number of clock pulses N2.

There is also provided, in accordance with a preferred embodiment of the present invention, a method for demodulating phase-modulated signals. The method performs the steps implemented by the elements of the demodulator, as described hereinabove.

BRIEF DESCRIPTION OF THE DRAWINGS

The present invention will be understood and appreciated more fully from the following detailed description taken in conjunction with the drawings in which.

DETAILED DESCRIPTION OF A PREFERRED EMBODIMENT

Figure 1:
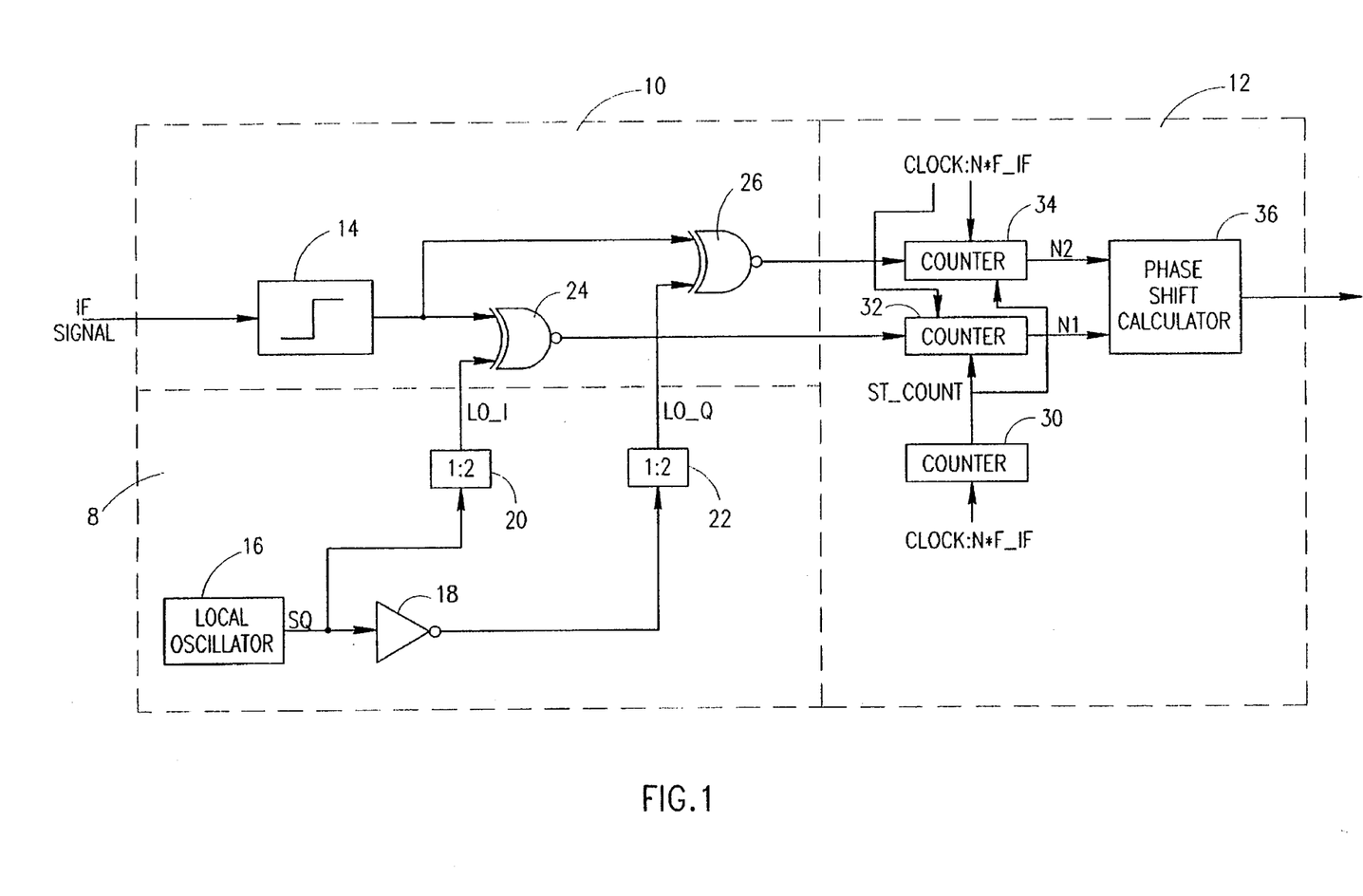
FIG. 1 is a schematic illustration of a low power digital demodulator, constructed and operative in accordance with a preferred embodiment of the present invention.
Figure 2:
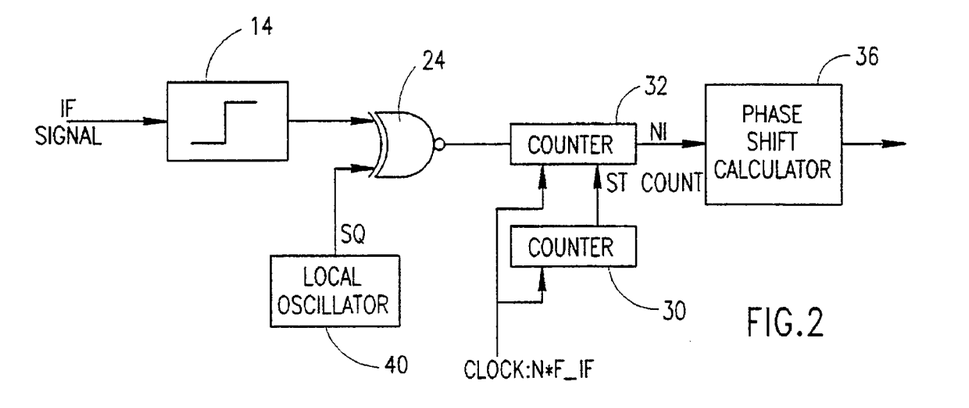
FIG. 2 is a schematic illustration of a low power digital demodulator useful for 2PSK modulated signals, constructed and operative in accordance with a preferred embodiment of the present invention.
Figure 4:
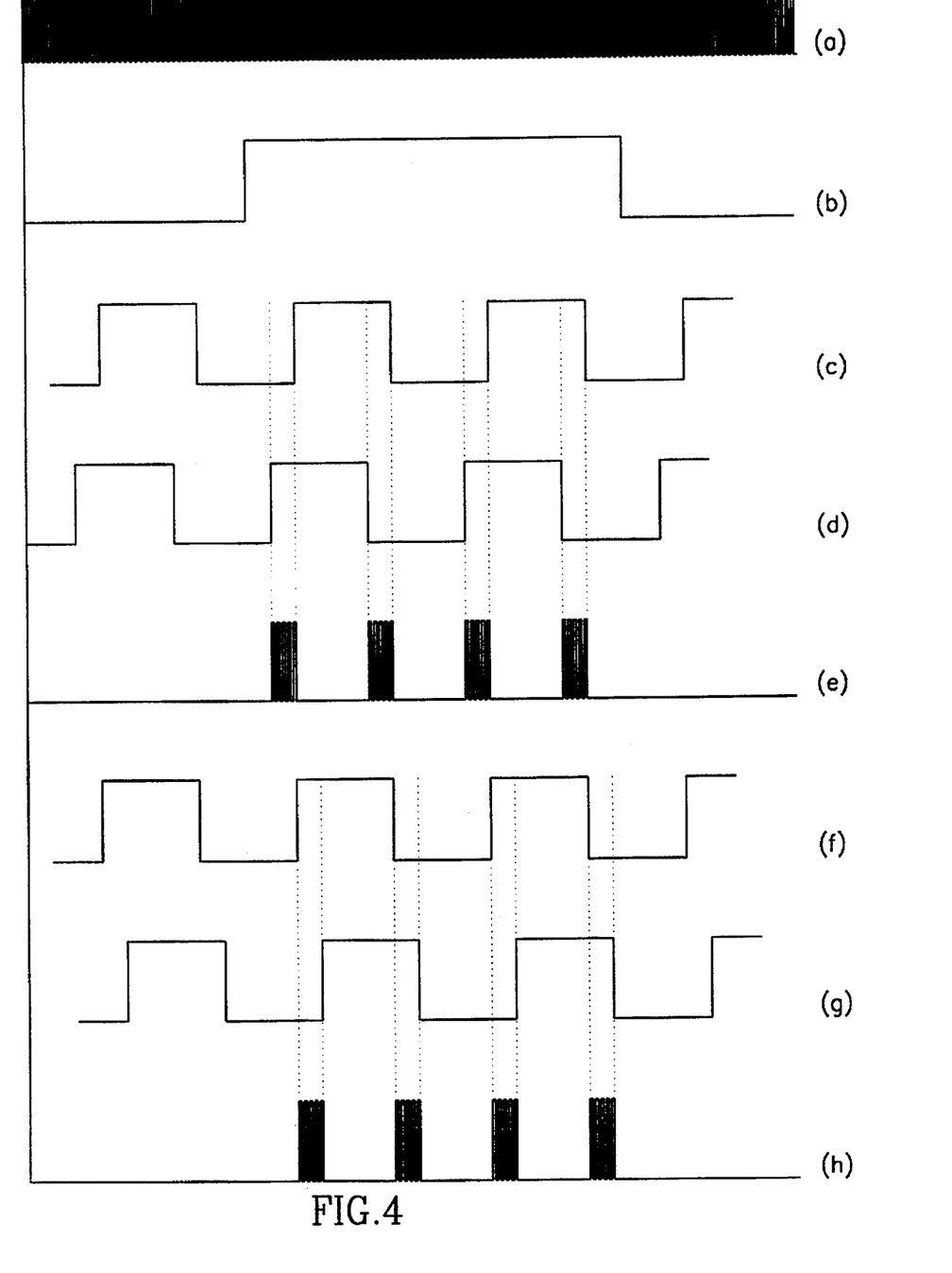
FIG. 4 is a timing diagram illustration of the waveforms of various signals of the circuit of FIG. 1.

Reference is now made to FIGS. 1, 2, and 4. FIG. 1 illustrates a demodulator for phase-shift modulated analog signals, constructed and operative in accordance with a preferred embodiment of the present invention. FIG. 2 illustrates an alternative embodiment for 2PSK coherent demodulation. FIG. 4 is a timing diagram of the signals of FIG. 1.

The demodulator typically comprises a reference generator 8, a phase sensing unit 10 and a phase shift determining unit 12. The reference generator 8 provides a reference signal at a base frequency of an input, analog, phase-modulated IF signal. The phase sensing unit 10 digitally senses the phase of the input IF signal with respect to the reference signal and the phase shift determining unit 12 determines the size of the phase shift, quantizing the phase shift to the levels desired by the modulation method.

Thus, if M-ary differential phase shift keying (MDPSK) is utilized, the phase shift between consecutive symbols is determined by subtracting two consecutive phase measurements. If M-ary phase shift keying (MPSK) coherent demodulation is implemented, then the phase shift is quantized to L levels, where L=M if hard decision coding is desired.

If the input IF signal was created with two phase shift keying 2PSK, the phase shift is quantized to two levels, 0° and 180°, for hard decision output.

The reference generator 8 typically generates two square waves (binary signals) LO_I and LO_Q with frequencies of generally the expected IF frequency F_IF. The two signals LO_I and LO_Q are phase shifted by 90°. Graphs (c) and (f) of FIG. 4 indicate the incoming IF signal and graphs (d) and (g) respectively indicate the reference signals LO_I and LO_Q.

The reference generator 8 typically comprises a local oscillator 16, a NOT gate 18, and two one stage counters 20 and 22. The local oscillator 16 typically produces a square wave SQ having a frequency F_LO generally of twice F_IF. One stage counter 20 produces the reference signal LO_I by dividing the frequency of SQ by two. The phase shifted reference signal LO_Q is produced by first inverting SQ (via NOT gate 18) and then dividing its frequency by 2 (via counter 22).

It is noted that if coherent modulation is utilized for the input IF signal, the reference signal LO_I must be locked to the phase of the IF signal.

The phase sensing unit 10 typically comprises a hard limiter 14, and two XOR gates 24 and 26. The hard limiter 14 limits the input analog IF signal to two values, thereby producing a binary signal. A typical hard limiter is a comparator.

The reference signals LO_I and LO_Q are XORed, via XOR gates 24 and 26 respectively, with the hard limited IF signal and the resultant XORed output signals are provided to the phase determining unit 12. The XORed signals indicate when the hard limited IF signal has the same binary value as the reference signals LO_I and LO_Q.

The phase determining unit 12 typically comprises three counters 30, 32 and 34 and a phase shift calculator 36. The counters 30–34 operate at a clock frequency F_CL which is typically N times the frequency F_IF. Graph (a) of FIG. 4 indicates the high frequency clock signal.

The first counter 30 is a sampling counter which provides a ST_COUNT signal indicating that counting should occur. When first counter 30 reaches a count of N, it ceases providing the signal ST_COUNT at which point sampling of the data in the counters 32 and 34 occurs. Graph (b) of FIG. 4 indicates the ST_COUNT signal and the period during which it is active.

While the ST_COUNT signal is active, the second counter 32 counts the number of clock periods N1 in which the local oscillating signal has the same sign as the hard limited IF signal. Graph (d) of FIG. 4 indicates the output of the second counter 32. The sum of the four groups of pulses shown is the value of N1. N1 indicates the percentage of the time when ST_COUNT was active in which the IF signal and the reference signal LO_I have the same sign. Thus, the magnitude of the phase between LO_I and the IF signal is determined by:

$$\text{abs(phase)} = \pi(N-N1)/N \tag{1}$$

N1 only indicates the magnitude of the phase; it does not indicate whether the input IF signal is phase shifted positively or negatively with respect to the reference signal LO_I. The output of the third counter 34 provides the sign of the phase, as follows.

The third counter 34 counts the number of clock periods N2, while the ST_COUNT signal is active, in which the hard limited IF signal has the same sign as the reference signal LO_Q. Graph (h) of FIG. 4 indicates the output of the third counter 34. The sum of the four groups of pulses shown is the value of N2. For example, if the input IF signal is not phase shifted from LO_I, then N1 will equal N and N2 will equal N/2. If the input IF signal is positively phase shifted by 10%, then N1 will be 0.9N and N2 will be 0.6N. If the input IF signal is negatively phase shifted by 10%, then N1 will still be 0.9N but N2 will be 0.4N. Thus, the sign is determined as follows:

$$\text{sign(phase)} = \begin{array}{l} +\text{for } N2 > N/2 \\ -\text{for } N2 \leq N/2 \end{array} \tag{2}$$

Using equations 1 and 2, the phase shift calculator 36 determines the phase and sign between the IF signal and the reference signal from the local oscillator 16. Equation 2 can be implemented in a simpler manner, as follows:

If $N=2^q$, then bit $D_{q-1}$ from counter 34 represents the sign bit.

If $N<2^q$ and $N>2^{q-1}$ then counter 34 should be preset to the value of $2^{q-1}-N/2$. In this condition, bit $D_{q-1}$ from counter 34 represents the sign bit.

The demodulator must also determine the phase shift between consecutive samples of the IF signal. This is determined by calculator 36 as follows:

$$\text{phase\_shift} = [\text{phase}(t) - \text{phase}(t-\tau)] \bmod \pi \tag{3}$$

wherein τ is the length of time between consecutive samples and "modπ" means that:

if phase_shift>π then phase_shift=phase_shift−2π if phase_shift<−π then phase_shift=phase_shift+2π  (4)

If differential phase shift keying modulation was employed, then the phase shift is computed once per symbol rather than once per sample as described hereinabove.

If a hard decision is required of the demodulator, the phase calculator 36 quantizes the resultant value for the phase shift in accordance with the desired number of quantization levels. If a soft decision is required, the value of the phase shift calculated by equation 1 is provided on output.

It will be appreciated that because the hard limiter 14 and the local oscillator 16 produce binary signals, the remainder of the elements of the demodulator of the present invention are digital.

In order to maximize performance and utilize the minimum power, the ratios between the modulation bandwidth, IF frequency and N should be optimized. As a rule, the IF frequency F_IF must be more than 5 times the modulation bandwidth. In order to reduce the affect of aliasing, N*F_IF must be much larger than F_IF. In order to achieve little degradation, N should be greater than 100.

It is possible to implement the present invention with a very low power clock, such as one which operates at a clock frequency F_CL of N*F_IF/K, where K is a positive integer greater than 1. In this embodiment, the resolution of the output is N, but it takes K IF cycles, rather than one cycle, to produce each sample.

If the local oscillator frequency is not exactly F_IF, the phase shift calculator 36 can compensate for the error delta_psi resulting from this mismatching of frequencies as follows:

$$\text{delta\_psi} = 2\pi(F\_IF - F\_LO\_I)\tau \qquad (5)$$

where F_LO_I is the frequency of the reference signal LO_I.

The demodulator of the present invention can also be utilized to demodulate IF signals with non-constant envelope modulation, provided that the envelope is constant during each sampling period. Examples of non-constant demodulation are MPSK and MDPSK produced with a raised cosine shaping filter.

The present invention can also be utilized to demodulate frequency modulated signals by estimating the instantaneous frequency. This is produced in the phase calculator 36 by subtracting two consecutive phase measurements and dividing the result by $\tau$.

It will further be appreciated that the elements utilized in the demodulator of the present invention are generally simple and that the demodulator utilizes less power than those of the prior art.

For a 2PSK demodulator producing hard decisions wherein it must be determined whether the phase shift is either of 0° or 180°, only the first and second counters 30 and 32 are utilized and the local oscillator, labeled 40, provides a signal at the frequency F_IF which is locked to the IF signal. This is illustrated in FIG. 2.

Reference is now briefly made to FIGS. 3A, 3B, 3C, 3D and 3E which are circuit diagrams of an exemplary implementation of the demodulator of FIG. 1. Since the circuit diagrams are believed to be self-explanatory, in the interest of conciseness, the following discussion will be brief.

Figure 3A:
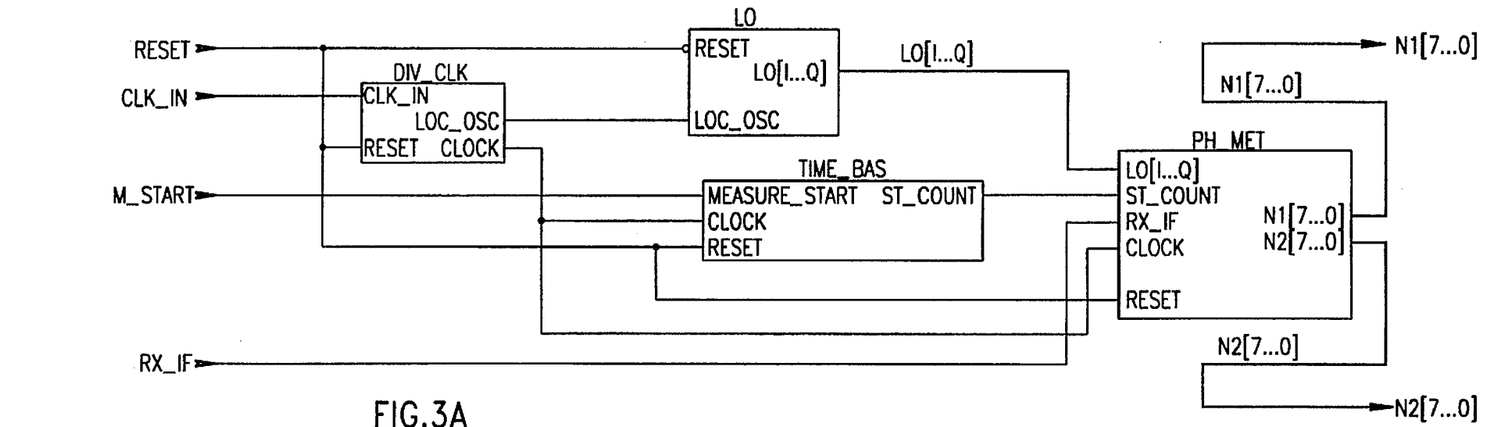
FIG. 3A is a circuit diagram illustration of an implementation of the digital demodulator of FIG. 1.
Figure 3B:
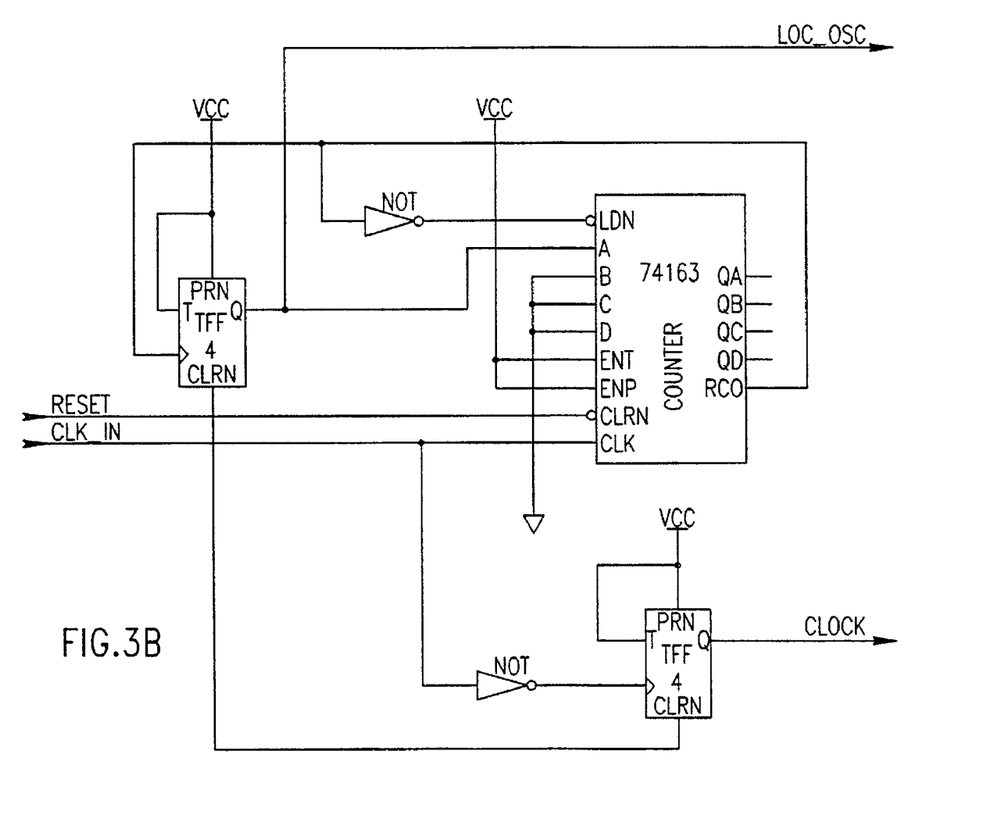
FIGS. 3B–3E are circuit diagram illustrations of elements of the digital demodulator of FIG. 3A.
Figure 3C:
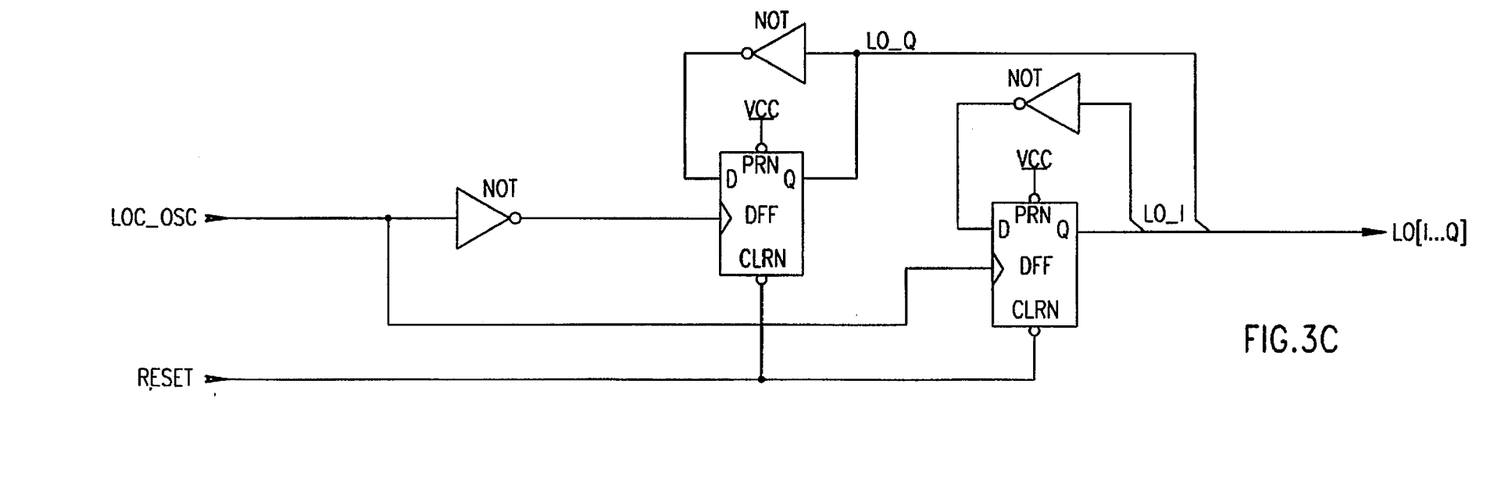
Figure 3D:
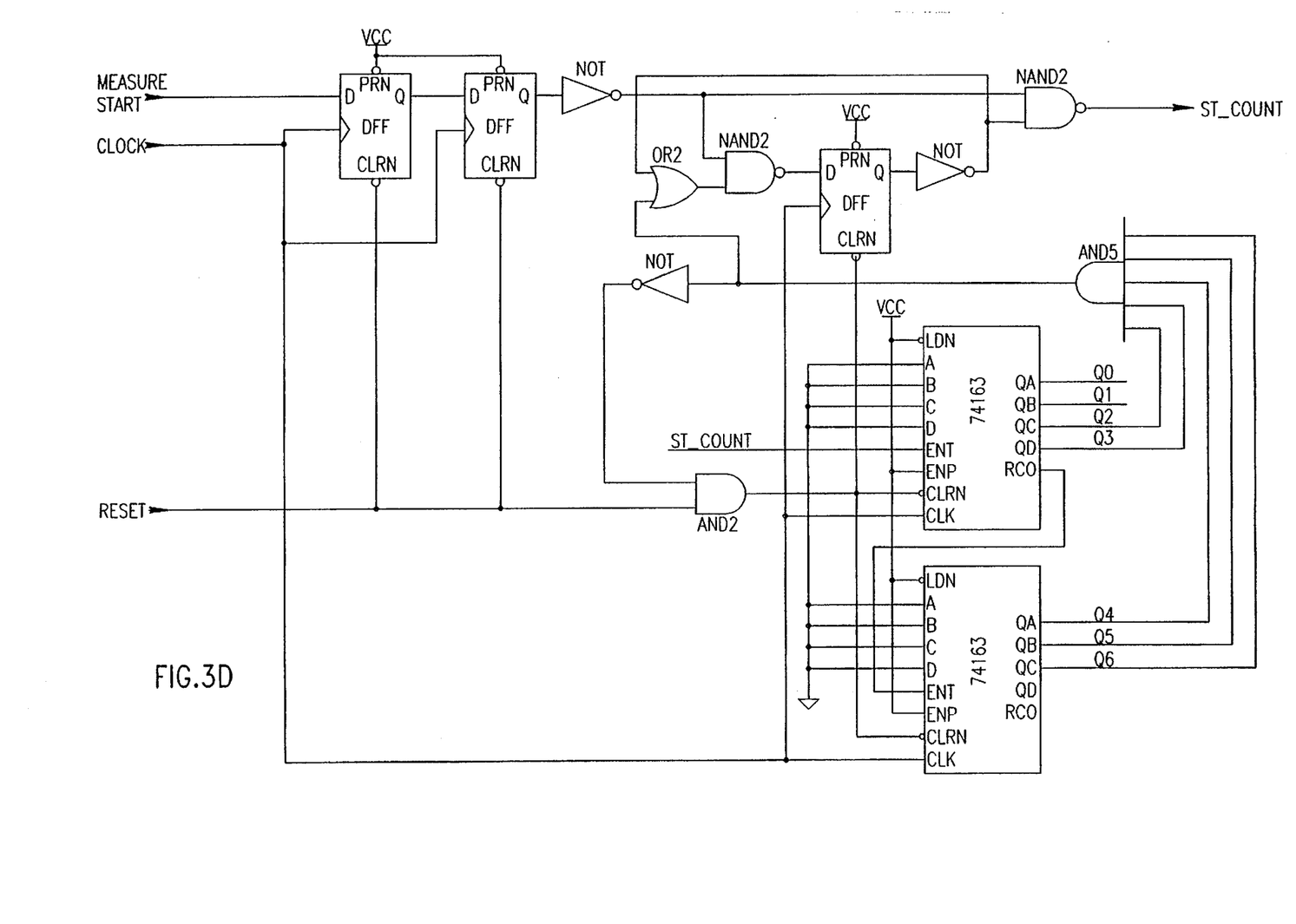
Figure 3E:
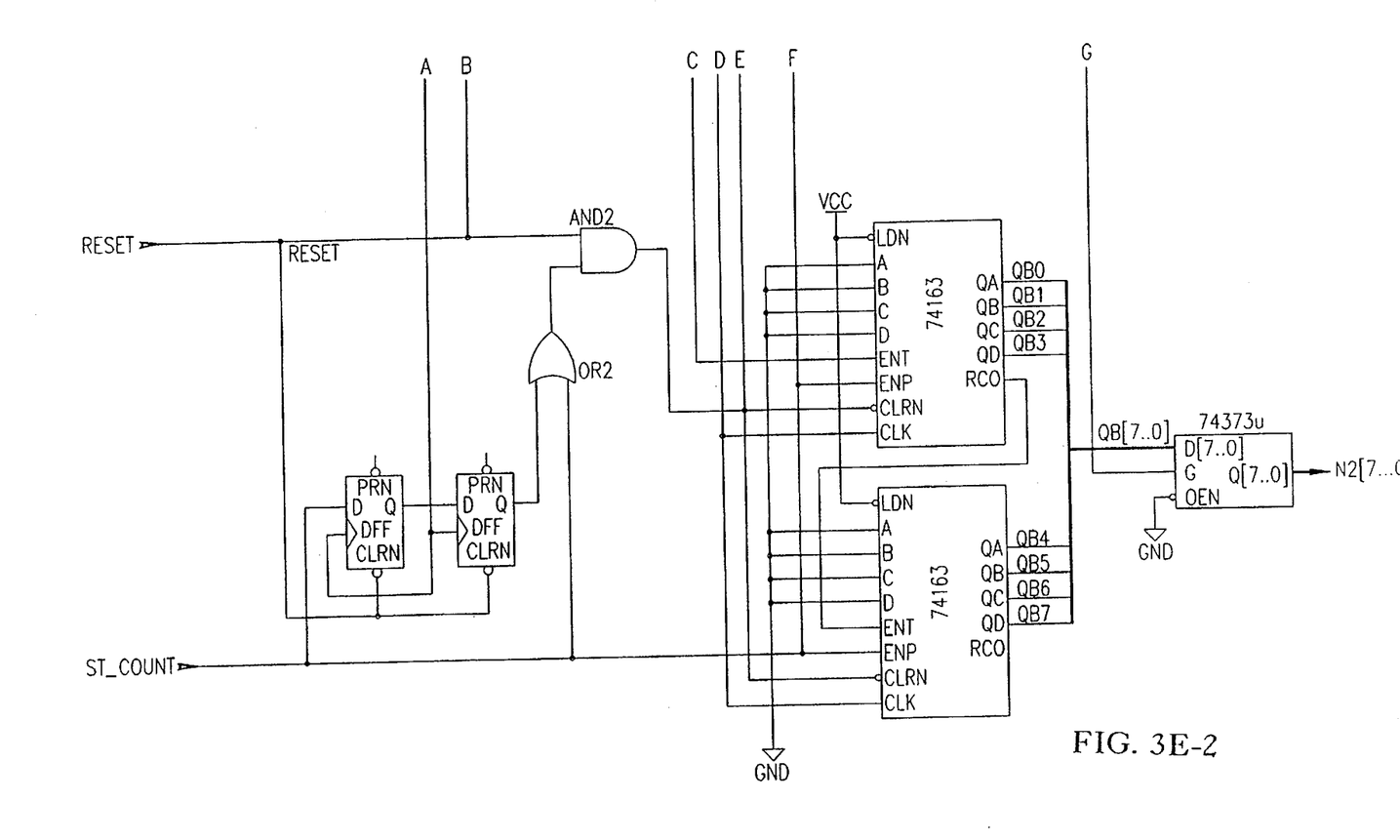
Figure 3E:
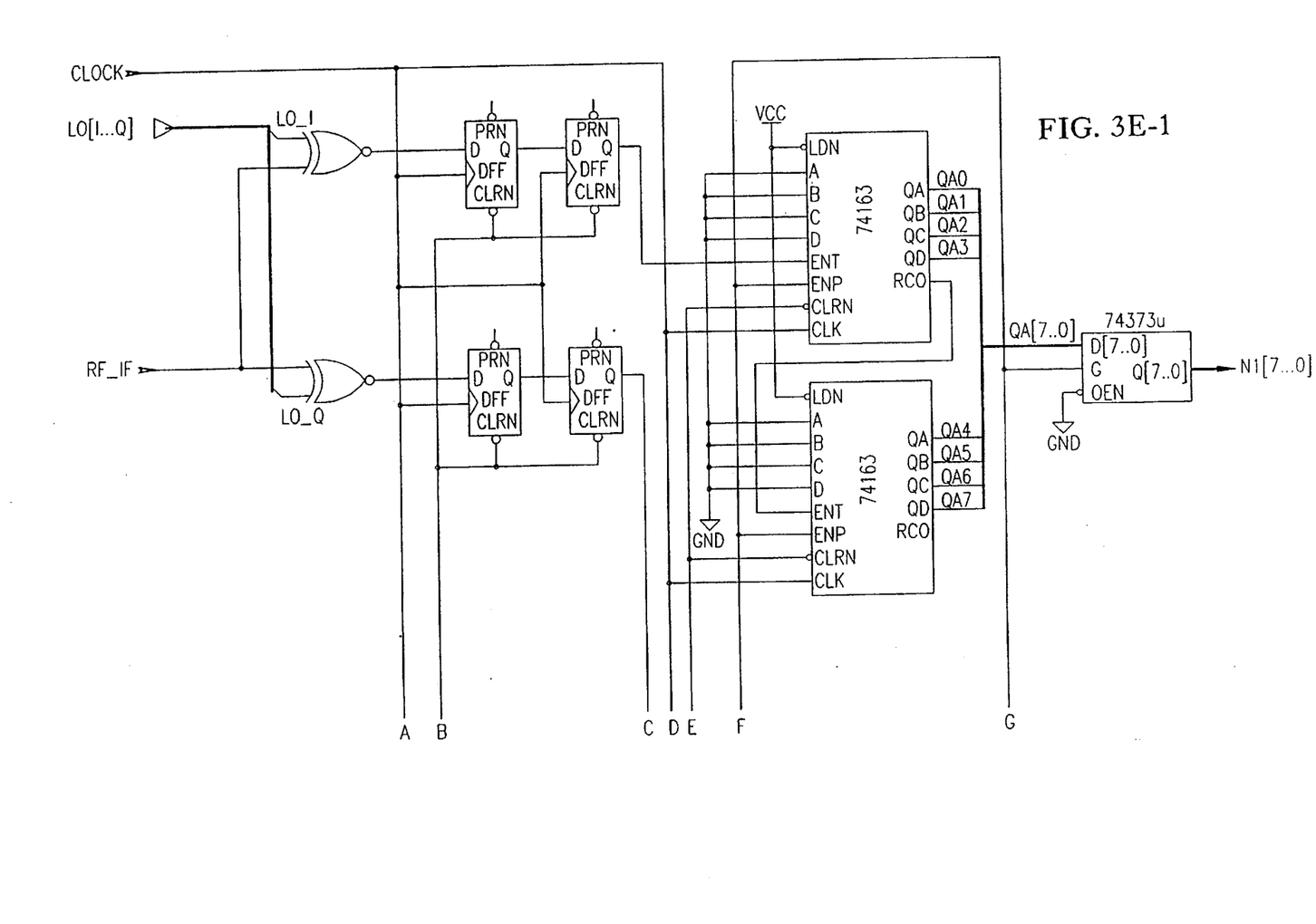

FIG. 3A illustrates the main elements, "div_clk", "lo", "time_bas" and "ph_met" which are respectively detailed in FIGS. 3B, 3C, 3D and 3E. The input signal of the circuit of FIG. 3A is an already hard-limited signal RX_IF and the output are the values N1 and N2. Thus, the hard limiter 14 and the phase shift calculator 36 are not shown in FIGS. 3A–3E. A digital signal processing chip, located outside of the circuit of FIGS. 3A–3E, implements the phase shift calculator 36.

Element div_clk provides clock signals throughout the demodulator. Element lo implements the reference generator 8. Element time_bas is equivalent to first counter 30 and produces the ST_COUNT signal. Element ph_met implements the XOR gates 24 and 26 and counters 32 and 34.

It will be appreciated by persons skilled in the art that the present invention is not limited to what has been particularly shown and described hereinabove. Rather the scope of the present invention is defined only by the claims which follow:

I claim:

1. A demodulator comprising:
    a hard limiter for producing a binary phase-modulated signal from an analog phase modulated input signal having a first frequency;
    reference generating means for providing a binary reference signal having a second frequency generally equivalent to said first frequency,
    digital means, operative during a sampling period, for determining the phase between said phase-modulated and reference binary signals during said sampling period, said digital means including:
        a XOR gate for producing a positive signal when said phase-modulated and reference binary signals have the same binary value;
        a clock providing clock pulses at a third frequency greater than said first frequency;
        first and second counters wherein said first counter provides a ST_COUNT signal having first and second edges which are N clock pulses apart and said second counter counts the number of clock pulses N1 between said first and second edges in which the output of said XOR gate is positive; and
        a phase shift calculator for determining the phase from said number of clock pulses N and N1 thereby to produce a demodulated output.

2. A demodulator according to claim 1 and wherein said reference generating means includes a phase-shifting unit for producing a phase-shifted reference binary signal which is a phase-shifted version of said reference binary signal.

3. A demodulator according to claim 2 wherein said reference generating means includes means for producing an initial signal which has a frequency of twice said first frequency, a divider for dividing said frequency by two thereby to produce said reference binary signal and wherein said phase-shifting unit is an inverter followed by a divider for dividing said second frequency of said initial signal in two.

4. A demodulator according to claim 2 and where said means for determining additionally comprises:
    a second XOR gate for producing a positive signal when said phase-modulated and phase-shifted reference binary signals have the same binary, value; and
    a third counter for counting the number of clock pulses N2 between said first and second edges in which the output of said second XOR gate is positive.

5. A demodulator according to claim 4 and wherein said digital means for determining also comprises a phase shift calculator for determining the phase from said number of clock pulses N1 and the sign of said phase from said number of clock pulses N2.

6. A demodulator according to claim 5 and wherein said phase shift calculator additionally comprises means for determining phase shifts between consecutive sampling periods of said input signal.

7. A demodulator according to claim 1 and wherein said phase shift calculator additionally comprises means for determining phase shifts between consecutive sampling periods of said input signal.

8. A method for demodulating phase-modulated signals, the method comprising the steps of:
    hard limiting an analog phase modulated input signal having a first frequency and producing thereby a binary phase-modulated signal;
    generating a binary reference signal having a second frequency generally equivalent to said first frequency;
    digitally determining the phase between said phase-modulated and reference binary signals during one sampling period, said step of digitally determining comprising the steps of:
    XORing said phase-modulated and reference binary signals;
    counting the number of clock pulses N1 between first and second edges of a ST_COUNT signal in which the output of said step of XORing is positive; and determining the phase from said number of clock pulses N1 thereby to provide a demodulated output.

9. A method according to claim 8 and also comprising the step of phase-shifting said reference binary signal thereby producing a phase-shifted reference binary signal.

10. A method according to claim 9 and where said step of digitally determining additionally comprises the steps of:

XORing said phase-modulated and phase-shifted reference binary signals; and counting the number of clock pulses N2 between said first and second edges in which the output of said second step of XORing is positive.

11. A method according to claim 10 and wherein said step of digitally determining also comprises the step of determining the phase from said number of clock pulses N1 and the sign of said phase from said number of clock pulses N2.

12. A method according to claim 8 and wherein said step of digitally determining additionally comprises the step of determining phase shifts between consecutive sampling periods of said input signal.

13. A method according to claim 10 and wherein said step of digitally determining additionally comprises the step of determining phase shifts between consecutive sampling periods of said input signal.

* * * * *